UNITED STATES PATENT OFFICE.

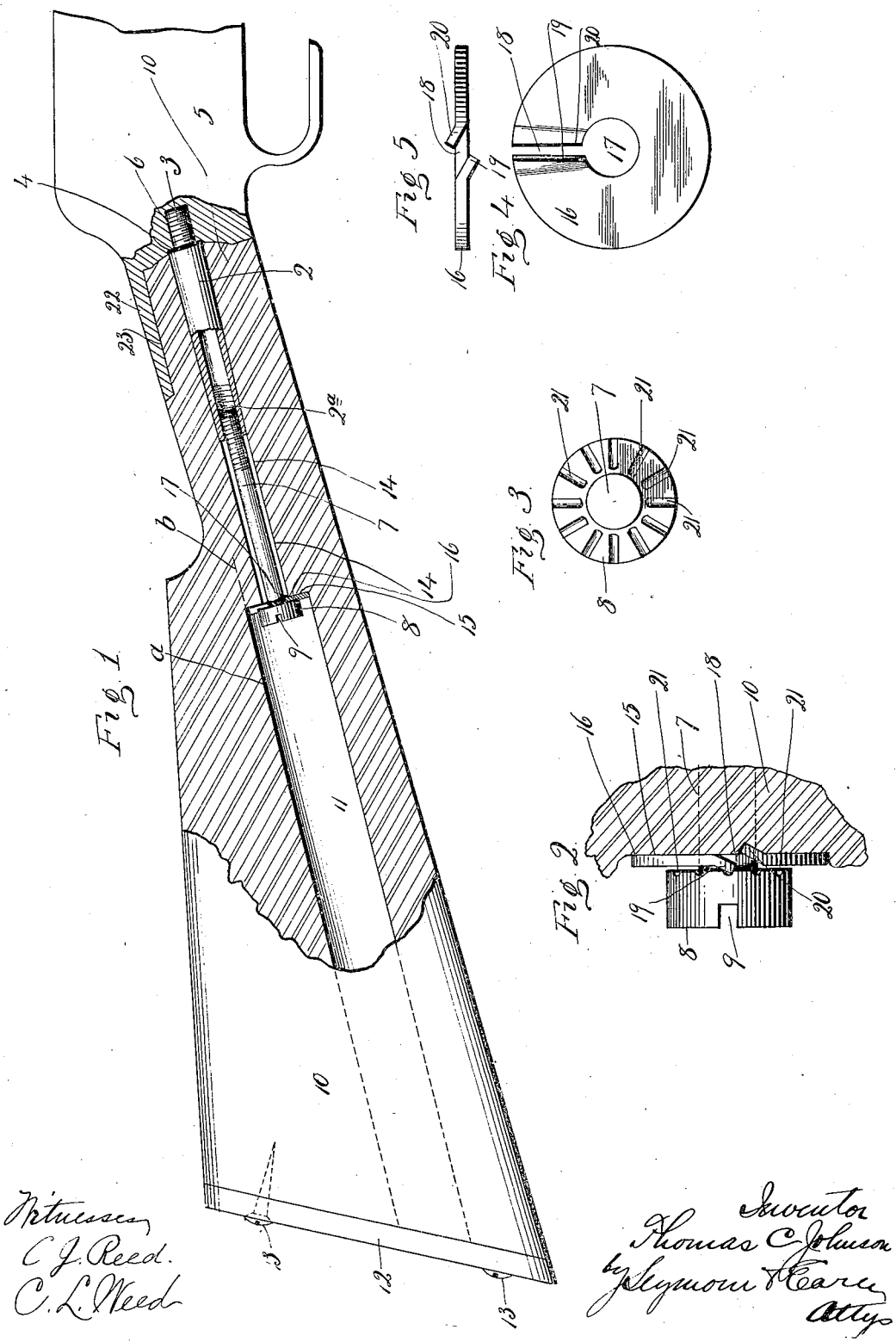

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

FIREARM.

963,444.  Specification of Letters Patent.  Patented July 5, 1910.

Application filed May 14, 1910. Serial No. 561,417.

*To all whom it may concern:*

Be it known that I, THOMAS C. JOHNSON, a citizen of the United States, residing at New Haven, in the county of New Haven and State of Connecticut, have invented a new and useful Improvement in Firearms; and I do hereby declare the following, when taken in connection with the accompanying drawings, and the characters of reference marked thereon, to be a full, clear, and exact description of the same, and which said drawings constitute part of this specification, and represent, in—

Figure 1 a broken view partly in side elevation and partly in vertical section of a gun constructed in accordance with my invention. Fig. 2 an enlarged view in horizontal section on the line a—b of Fig. 1. Fig. 3 a detached view in inside elevation of the butt-stock bolt. Fig. 4 a detached plan view of the locking-washer. Fig. 5 an edge view thereof.

My invention relates to an improvement in that class of shoulder arms in which the butt-stock is secured to the frame of the arm by means of a screw bolt and shank arranged in line with the longitudinal axis of the stock, the object being to improve the construction of arms of this class with particular reference to fastening the stock and frame together with great solidity and so as to prevent them from working loose under the repeated shocks of recoil.

With these ends in view my invention consists in a firearm having certain details of construction as will be hereinafter described and pointed out in the claims.

In carrying out my invention as herein shown, I employ a tapering shank 2 provided at its forward end with a threaded stem 3 separated from the forward end of the shank by means of an annular shoulder 4 which is brought to a solid bearing upon the rear end of the gun-frame 5 by screwing the stem 3 into a threaded socket 6 formed in the said frame. It will be understood that the shank 2 is in this manner secured to the frame so solidly as to virtually form a part thereof. At its rear and smaller end the shank 2 is formed with a threaded socket 2ª for the reception of the threaded forward end of a screw-bolt 7 furnished at its rear end with a head 8 having a notch 9 for the application of a screw-driver, which is not shown, but which, it will be understood, is introduced into the butt-stock 10 through a long bore 11 formed therein and extending in line with the longitudinal axis thereof, the rear end of the bore 11 being normally closed by the butt-plate 12 which is secured in place by screws 13. Leading out of the forward end of the bore 11 and in line therewith is a smaller bore 14 which extends forward through the forward end of the butt-stock and receives the said screw-bolt 7 and the shank 2, an annular bearing-shoulder 15 being formed between the forward end of the larger bore 11 and the rear end of the smaller bore 14, and this bearing-shoulder being located in a plane at a right angle to the line of recoil.

Between the face of the shoulder 15 and the inner face of the bolt-head 8, I locate a locking-device consisting, as shown, of a spring-steel washer 16 having a central opening 17 for the passage of the screw-bolt 7 through it, and formed with a radial cut 18 the edges of which are bent in the opposite direction for the production of teeth 19 and 20. When the bolt 7 is turned home, the tooth 20 takes into the shoulder 15, and the tooth 19 into the forward face of the bolt-head 8, or vice versa. If desired, the said inner face of the bolt-head 8 may be formed with shallow radial notches 21 for the reception of one or the other of the two teeth 19 and 20, as the case may be. In any case the said washer will be located in a plane at a right angle to the line of recoil as should any locking-device which might, in carrying out my invention, replace the said washer.

Under this construction, the butt-stock 10 may be fastened to the frame 5 with great solidity as the draft of the tapered shank 2 and screw-bolt 7 are in line with the longitudinal axis of the butt-stock which is firmly held against rotation, as shown, by the entrance of the upper tang 22 into a recess 23 in the upper face of the butt-stock. Now as the bolt 7 is held against rotation by the washer 16 which bites into the wood of the butt-stock on the one hand, and into the metal of the bolt-head 8 on the other hand, the bolt is firmly held against rotation and therefore prevented from loosening under the repeated shocks of recoil which would otherwise gradually tend to loosen the bolt and destroy the rigidity of connection between the gun-frame and the butt-stock. It should be said in this connection that the shock of recoil tends to compress that portion of the butt-stock between the gun-frame and the bolt-head, and this compression, although extremely slight, will in time permit the bolt to rotate and destroy that rigidity of connection between the frame and butt-stock which is necessary.

In using the word "gun-frame" I have used it to cover both of those portions of the frame known as the "receiver" and "tang," as it is apparent that it is immaterial so far as my present invention in concerned, whether the shank receiving the threaded forward end of the screw-bolt is fastened to one portion of the frame or the other.

I claim:—

1. In a shoulder arm, the combination with the frame thereof, of a shank rigidly secured thereto and extending rearwardly therefrom, and formed at its rear end with a threaded socket, a chambered butt-stock, a screw-bolt located within the said chambered butt-stock in line with the longitudinal axis thereof and extended at its forward end into the threaded socket in the rear end of the said shank, and means located within the butt-stock and co-acting therewith and the head of the screw-bolt to secure the same against rotation under the shock of recoil.

2. In a shoulder arm, the combination with the frame thereof, of a shank provided at its forward end with a bearing-shoulder and with a threaded stem, which latter is screwed into a socket in the frame to bring the said shoulder to a solid bearing thereupon, and the rear end of the shank being formed with a threaded socket; a butt-stock formed with a long bore entering it from its rear end and arranged in line with its longitudinal axis, and with a smaller bore leading out of the forward end of the bore aforesaid and extending forward through the forward end of the butt-stock in line with the axis thereof, the two bores being separated by a shoulder; a screw-bolt located in the bores of the butt-stock and entered at its forward end into the threaded socket of the shank, a locking-device interposed between the head of the screw-bolt and the shoulder formed between the two bores of the butt-stock, the said device co-acting with the said shoulder and with the inner face of the bolt head to firmly hold the bolt against rotation under the shock of recoil, and means connected with the frame and co-acting with the forward end of the butt-stock for holding the same against rotation with respect to the said shank.

In testimony whereof, I have signed this specification in the presence of two subscribing witnesses.

THOMAS C. JOHNSON.

Witnesses:
CLARA L. WEED,
CLIFFORD J. REED.